(12) United States Patent
Wang et al.

(10) Patent No.: US 12,476,918 B2
(45) Date of Patent: Nov. 18, 2025

(54) AI-ASSISTED WAN LINK SELECTION FOR SD-WAN SERVICES

(71) Applicant: Juniper Networks, Inc., Sunnyvale, CA (US)

(72) Inventors: Jisheng Wang, Palo Alto, CA (US); Michael Baj, Bedford, MA (US); Patrick Timmons, Newton, MA (US); Patrick J. MeLampy, Dunstable, MA (US); Kaushik Adesh Agrawal, Chelmsford, MA (US); Ruchit Rajkumar Mehta, Emeryville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/628,122

(22) Filed: Apr. 5, 2024

(65) Prior Publication Data

US 2024/0250910 A1 Jul. 25, 2024

Related U.S. Application Data

(62) Division of application No. 17/491,265, filed on Sep. 30, 2021, now Pat. No. 11,991,084.

(51) Int. Cl.
*H04L 47/2425* (2022.01)
(52) U.S. Cl.
CPC .............. *H04L 47/2425* (2013.01)
(58) Field of Classification Search
None
See application file for complete search history.

(56) References Cited

U.S. PATENT DOCUMENTS

| | | | |
|---|---|---|---|
| 10,708,144 B2 | 7/2020 | Mohan et al. | |
| 11,108,651 B1* | 8/2021 | Mermoud | H04L 41/16 |
| 11,381,474 B1 | 7/2022 | Kumar et al. | |
| 11,463,365 B1 | 10/2022 | Vasseur et al. | |
| 2020/0153701 A1* | 5/2020 | Mohan | H04L 41/5009 |
| 2020/0351172 A1 | 11/2020 | Vasseur et al. | |

(Continued)

FOREIGN PATENT DOCUMENTS

EP 3654589 A1 5/2020

OTHER PUBLICATIONS

Extended Search Report from counterpart European Application No. 21212527.2 dated May 20, 2022, 8 pp.

(Continued)

*Primary Examiner* — Benjamin Lamont
(74) *Attorney, Agent, or Firm* — Shumaker & Sieffert, P.A.

(57) ABSTRACT

An example method includes receiving, by a software-defined networking in a wide area network (SD-WAN) system having a first WAN link and a second WAN link for an SD-WAN service, WAN link characterization data for the first WAN link over a time period; determining, by the SD-WAN system based on processing the WAN link characterization data for the first WAN link using a machine learning model trained with historical WAN link characterization data for one or more WAN links, an indicator of a predicted performance metric of the first WAN link at a future time; and reassigning, by the SD-WAN system based on the indicator, an application from the first WAN link to the second WAN link.

20 Claims, 8 Drawing Sheets

(56) References Cited

U.S. PATENT DOCUMENTS

| | | |
|---|---|---|
| 2020/0379839 A1 | 12/2020 | Savalle et al. |
| 2021/0126870 A1* | 4/2021 | Thiel ..................... H04L 47/12 |
| 2021/0184764 A1 | 6/2021 | Metzger et al. |
| 2022/0052927 A1* | 2/2022 | Yelahanka Raghuprasad ............. H04L 41/5025 |
| 2023/0107735 A1 | 4/2023 | Wang et al. |

OTHER PUBLICATIONS

Prosecution History from U.S. Appl. No. 17/491,265, dated Nov. 16, 2022 through Dec. 18, 2023, 71 pp.

Response to Extended Search Report dated May 20, 2022, from counterpart European Application No. 21212527.2 filed Oct. 4, 2023, 25 pp.

* cited by examiner

AI-ASSISTED WAN LINK SELECTION FOR SD-WAN SERVICES

This application is a divisional filing of U.S. patent application Ser. No. 17/491,265, filed 30 Sep. 2021, the entire contents of which is incorporated herein by reference.

TECHNICAL FIELD

The disclosure relates to computer networks and, more specifically, to software-defined networking in a wide area network (SD-WAN).

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and enterprises may use software-defined networking in a wide area network (SD-WAN) to manage network connectivity among distributed locations, such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

An SD-WAN service enables users, such as enterprises, to use the WAN links to meet business and customer needs. In an SD-WAN environment, low-priority traffic can use the lower-cost Internet-based WAN link(s), while more important traffic can travel across better quality WAN links (such as those provided by an MPLS network). WAN link usage can also be assigned per application. With an SD-WAN solution, an enterprise customer can mix and match cost optimization with SLA requirements as they see fit. Users may expect their applications to experience connectivity having an acceptable level of quality, commonly referred to as Quality of Experience (QoE). The QoE may be measured based on various performance metrics of a link, including latency, delay (inter frame gap), jitter, packet loss, and/or throughput. The user may define desired levels for one or more of the metrics for the QoE that the users expect in service contracts, e.g., service level agreements (SLAs), with the service provider. SLA metrics are typically user configurable values and are derived through trial-and-error methodologies or benchmark test environment versus user experience or realistic best application metrics. A WAN link may experience instability as evidenced by a degradation in any one or more of the performance metrics for the WAN link, such as increased latency, delay, or packet loss; or reduced throughput.

SUMMARY

In general, the disclosure describes techniques for WAN link selection in an SD-WAN edge device within an SD-WAN system during conditions of network instability. The techniques include a network analysis system that receives network performance indicators from various physical and logical network devices that implement an SD-WAN. The network analysis system uses machine learning techniques to train and apply a machine learning model that can predict WAN link stability over time based on past and current conditions of the WAN link. The network analysis system may use such predictions to influence WAN link selection by SD-WAN edge devices.

For example, an SD-WAN system can receive WAN link characterization data for a first WAN link over a predetermined or configurable time interval. The WAN link characterization data can be processed using the machine learning model to determine an indicator of a predicted performance metric of the first WAN link, such as a predicted performance metric. For example, the indicator of the predicted performance metric can be a predicted value for a performance metric for the first WAN link at a future time. The predicted value for the performance metric may be an indicator of the stability (or instability) of the WAN link at the future time. The SD-WAN system can use the indicator of the predicted performance metric of the first WAN link to determine whether or not to reassign an application using the first WAN link from the first WAN link to a second WAN link. In some aspects, the indicator of the predicted performance metric may indicate, or be associated with, a time period for which the first WAN link may be unstable. If this time period is less than a predetermined or configurable tolerance interval, the SD-WAN system can determine to continue using the first WAN link, thereby avoiding the overhead of switching to the second WAN link. If the time period is greater than the tolerance interval, the SD-WAN system can determine to reassign an application from the first WAN link to the second WAN link.

In some aspects of this disclosure, a machine-learning engine of a network analysis system can receive WAN link characterization data from physical network devices that are used to provide network connectivity for SD-WAN edge devices. For example, an SD-WAN edge device may be configured to utilize a broadband network device or a mobile network device (e.g., a 5G or LTE device). The machine-learning engine can receive service data and performance data for the broadband network device and the mobile network device. WAN link performance metrics can include jitter, latency, packet loss, time to first packet, average length of sessions, packet retransmission rate, etc. Service data can include link bandwidth, maximum transmission unit (MTU), etc. The machine-learning engine can learn from previous behavior of a WAN link in order to predict future performance of the WAN link.

The machine learning engine can generate a machine-learning model that receives WAN link characterization data and can generate indicators of future performance of a WAN link, such as a predicted performance metric. The indicator may indicate that instability in a WAN link is predicted to occur at a future time. In some aspects, the machine-learning model can be pushed to components of the SD-WAN system, such as SD-WAN edge devices. The components can then process WAN link characterization data using the machine-learning model to determine indicators of predicted performance metrics of WAN links. In some aspects, a component of a system such as an SD-WAN edge device can provide performance metrics to a network analysis system, which can use the machine-learning model to generate the indicator of the predicted performance metric of the WAN link.

The techniques disclosed herein may be included in a practical application that provides technical advantages over existing systems. For example, in existing systems, a decision to reassign an application from a first network path to a second network path is typically based on immediate-term network conditions. However, if network conditions change often, a network device may switch back and forth between WAN links, resulting in thrashing and a large amount of overhead in making the switches. A technical advantage of the techniques disclosed herein is that such changes can be avoided if the network instability is predicted to be shorter than a tolerance interval. Different services may have different tolerance intervals. For example, video streaming applications and VOIP applications may have a low tolerance for instability, and a correspondingly short tolerance interval. Other services, such as file transfer services or software update services, may have a long tolerance interval. The techniques disclosed herein can provide for minimizing the number of network path switches, thereby reducing system overhead when compared with existing systems.

In one example, this disclosure describes a method that includes receiving, by an SD-WAN system having a first WAN link and a second WAN link for an SD-WAN service, WAN link characterization data for the first WAN link over a time period; determining, by the SD-WAN system based on processing the WAN link characterization data for the first WAN link using a machine learning model trained with historical WAN link characterization data for one or more WAN links, an indicator of a predicted performance metric of the first WAN link at a future time; and reassigning, by the SD-WAN system based on the indicator, an application from the first WAN link to a second WAN link.

In another example, an SD-WAN system includes a network analysis system comprising processing circuitry configured to: receive WAN link characterization data for a first WAN link over a time period, and determine based on processing the WAN link characterization data for the first WAN link using a machine learning model trained with historical WAN link characterization data for one or more WAN links, an indicator of a predicted performance metric of the first WAN link at a future time, provide the indicator of the predicted performance metrics to an SD-WAN edge device; and the SD-WAN edge device comprising processing circuitry configured to: receive the indicator of the predicted performance metric, and reassign, based on the indicator, an application from the first WAN link to a second WAN link.

In another example, an SD-WAN edge device includes one or more processors; and a memory storing instructions, that when executed, cause the one or more processors to: receive WAN link characterization data for a first WAN link communicatively coupled to the SD-WAN edge device over a time period, and determine based on processing the WAN link characterization data for the first WAN link using a machine learning model trained with historical WAN link characterization data for one or more WAN links, an indicator of a predicted performance metric of the first WAN link at a future time, and reassign, based on the indicator, an application from the first WAN link to a second WAN link communicatively coupled to the SD-WAN edge device.

The details of one or more examples are set forth in the accompanying drawings and the description below. Other features, objects, and advantages will be apparent from the description and drawings, and from the claims.

DETAILED DESCRIPTION

Figure 1:
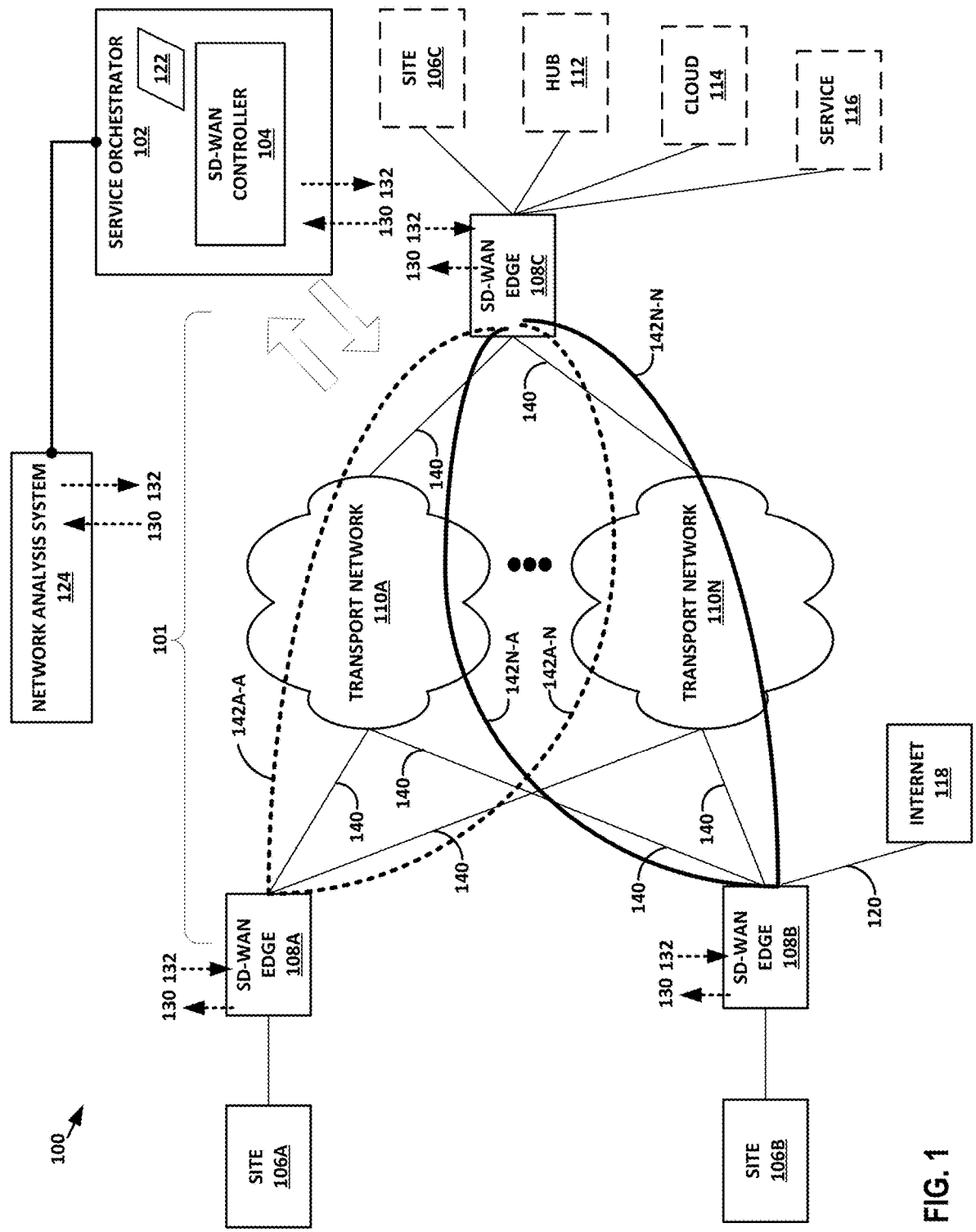
FIG. 1 is a block diagram illustrating an example software-defined wide area network (SD-WAN) system implemented in a network, according to techniques described in this disclosure.

FIG. 1 is a block diagram illustrating an example software-defined wide area network (SD-WAN) system implemented in a network, in accordance with the techniques of this disclosure. SD-WAN system 100 includes transport networks 110A-110N (collectively, "transport networks 110") for connecting sites attached to transport networks and for transporting network traffic between such attached sites. One or more service providers may deploy transport networks 110, which may therefore alternatively be referred to as "service provider networks." Sites attached to service provider networks may be referred to as "subscriber sites." As used herein, the terms "subscriber," "customer," and "tenant" may be used interchangeably.

A service provider uses SD-WAN system 100 to offer an SD-WAN service 101 to its subscribers or organizations authorized by such subscribers, which may include cloud providers, cloud networks, and subscriber partners for instance. SD-WAN service 101 provides a virtual overlay network that enables application-aware, orchestrated connectivity to deliver IP packets between sites associated with a subscriber according to policies. The service provider may offer multiple SD-WAN services.

SD-WAN system 100 includes service orchestrator 102, SD-WAN controller 104, and multiple SD-WAN edge devices 108A-108C (hereinafter, "SD-WAN edges" and collectively, "SD-WAN edges 108") that implement SD-WAN service 101. SD-WAN edges 108 are connected to one another by transport networks 110. Control and ownership of service orchestrator 102, SD-WAN controller 104, SD-WAN edges 108, and transport networks 110 may be distributed among one or more service providers, subscribers, enterprises, or other organizations. However, the SD-WAN service provider uses all of these components to provide the SD-WAN service 101. The SD-WAN service provider may be an enterprise, network/Internet service provider, cloud provider, or other entity.

In general, service orchestrator 102 manages SD-WAN services. Service orchestrator 102 may control, fulfill, configure, monitor usage, assure, analyze, secure, modify, reconfigure, and apply policies to SD-WAN services. Service orchestrator 102 may establish application-based forwarding over transport networks 110 based on security policies, Quality of Service (QoS) policies, QoE policies, and/or business or intent-based policies. Service orchestrator 102 may contain or represent a Network Service Orchestrator (NSO).

Service orchestrator 102 has awareness of resources of network system 100 and may enable, for example: tenant site and service management; end-to-end traffic orchestration, visibility, and monitoring; physical network function (PNF) and/or virtual network function (VNF) management; policy and SLA management (PSLAM) to enable SD-WAN functions; routing management for managing routing operations including creating virtual private networks, enabling routing on SD-WAN edges 108, and interfacing to route reflectors and routers; telemetry services that provide interfaces used by fault monitoring and performing monitoring systems for collecting service check results from telemetry agents; and network activation functions to enable device provisioning. At least some of the above functions may be performed by components of a separate or integrated SD-WAN controller 104.

SD-WAN controller 104 may contain or represent a Network Service Controller (NSC). In general, service orchestrator 102 interacts with SD-WAN controller 104 to manage SD-WAN edges 108 to create and operate end-to-end SD-WAN managed services between SD-WAN edges 108 over transport networks 110. SD-WAN controller 104 may provide topology and SD-WAN edge 108 lifecycle management functionality. For example, SD-WAN controller 104 provides PNF/VNF management for SD-WAN edges 108 managed by service orchestrator 102. For example, SD-WAN controller 104 may configure the network configurations of SD-WAN edges 108, configure policies on SD-WAN edges 108, and so forth.

SD-WAN controller 104 may monitor statuses and performance data for SD-WAN edges 108 and WAN links 142A-A-142N-N (collectively, "WAN links 142") and provide this information to the service orchestrator 102. In other words, SD-WAN controller 104 may communicate with SD-WAN edges 108 to determine the operational state of WAN links 142 across transport networks 110 and to obtain QoS/QoE performance metrics for WAN links 142. SD-WAN system 100 may, based on the performance metrics for the WAN links, modify traffic patterns to better meet SLA demands for SD-WAN services in network system 100. Additionally, as further described below, SD-WAN system 100 may use the performance metrics, along with other WAN link characterization data, to determine whether to reassign WAN links that experience degraded performance or instability to other, more stable WAN links. Such instability can have various causes, including network conditions such as network faults or congestion, too many applications or services on the link, certain applications or services on the link consuming network large amounts of network resources. Additionally, such instability may be periodic and/or related to time of day, day of week, etc.

In various examples of SD-WAN system 100, service orchestrator 102 and SD-WAN controller 104 may, for example, be combined to form a single service orchestration platform having separate service orchestration and domain orchestration layers, deployed as separate devices or appliances, or each may be distributed among one or more components executing on one or more servers deployed in one or more locations. Service orchestrator 102 may be a scalable and cloud deployable platform. For example, the service provider for SD-WAN services in network system 100 may deploy service orchestrator 102 to a provider site or to a public, private, or hybrid cloud. As such, operations and functions attributed in this disclosure to service orchestrator 102 may be performed by a separate SD-WAN controller 104, and vice-versa. Aspects of service orchestration and SD-WAN control may also be distributed from service orchestrator 102 and SD-WAN controller 104, respectively, among SD-WAN edges 108 in some example architectures.

Administrators and applications may interface with service orchestrator 102 using northbound interfaces such as RESTful interfaces (e.g., web-based REST APIs), command-line interfaces, portal or graphical user interfaces, web-based user interfaces, or other interfaces of service orchestrator 102 (not shown in FIG. 1). Service orchestrator 102 may communicate with SD-WAN controller 104 via a southbound interface, which may be a northbound interface of SD-WAN controller, such as RESTful interfaces, command-line interfaces, graphical user interfaces, or other interfaces of service orchestrator 102 (not shown in FIG. 1).

Network links 140 connect SD-WAN edges 108 to transport networks 110. Network links 140 and transports networks 110 make up the underlay network for the SD-WAN service 101 and offer underlay connections between pairs of SD-WAN edges 108. For example, transport network 110A and transport network 110N offer separate underlay connections (not shown in FIG. 1) between SD-WAN edge 108A and SD-WAN edge 108C. The underlay connection may be public or private and may be a network service offering, such as a label switched path (LSP), an Ethernet service, and IP service, a public Internet service, broadband service, fifth generation (5G) service, long term evolution (LTE) service, or other service that enables an overlay WAN link Costs for usage of an underlay connection may be flat-rate or usage-based. Each underlay connection may have a bandwidth limitation, performance metrics (e.g., latency, loss, jitter, and so forth).

SD-WAN service 101 may be deployed using underlay connections based on multiple different types of network service. In the example of FIG. 1, for instance, an underlay connection from SD-WAN 108A to SD-WAN edge 108C via transport network 110A may be an LSP for an IP-VPN, while an underlay connection from SD-WAN 108A to SD-WAN edge 108C via transport network 110N may be an Internet Protocol Security (IPSec) tunnel over the Internet. This diversity may be advantageous for an SD-WAN service by facilitating redundancy and by offering differentiated service capabilities to enable matches between cost/performance and application requirements/SLA for different traffic that uses the SD-WAN service. For example, SD-WAN edge 108A may direct low-cost traffic via the Internet while directing traffic for an application that requires low-latency (e.g., Voice-over-IP) via an LSP. An underlay connection may be created and/or managed by the SD-WAN service provider or by the SD-WAN service 101 subscriber that notifies service orchestrator 102 of the underlay connection.

Service orchestrator 102 obtains the link data for WAN links 142, including bandwidth limitations for WAN links 142 (if any). Service orchestrator 102 may obtain the link data from SD-WAN controller 104, receive configuration data that has the link data, or obtain the link data from another network controller or from SD-WAN edges 108. WAN links 142 are described and illustrated as bidirectional, but each of WAN links 142 may represent two separate WAN links, one for each direction.

SD-WAN system 100 illustrates multiple sites associated with a subscriber of the SD-WAN service 101 provider and attached to subscriber-facing interfaces of SD-WAN edges 108. These sites may be referred to as subscriber sites, which make up the subscriber network in that SD-WAN service 101 interconnects the multiple sites to form a single network. Network system 100 in the example of FIG. 1 includes sites 106A-106B and may optionally include any of site 106C, hub 112 (sometime referred to as a "provider hub"), cloud 114, or cloud service 116. In some cases, the "subscriber" and the SD-WAN provider are the same entity, as where an enterprise deploys and manages SD-WAN system 100.

Each of sites 106A-106C refers to a subscriber location and may represent, for example, a branch office, private cloud, an on-premises spoke, an enterprise hub, or a cloud spoke. Hub 112 represents a multitenant hub device located in a point-of-presence (PoP) on the service provider network. Hub 112 may terminate overlay tunnels for overlay networks, which may be of various types such as MPLS over Generic Route Encapsulation (MPLSoGRE) and MPLSoGRE over IPSec (MPLSoGREoIPsec) and MPLS over User Datagram Protocol (MPLSoUDP) tunnels. Hub 112 may be the hub in a hub-and-spoke architecture for some example deployments of SD-WAN service 101.

Cloud 114 represents a public, private, or hybrid cloud infrastructure. Cloud 114 may be a virtual private cloud within a public cloud. Cloud service 116 is a resource or higher order service that is offered by a cloud service provider to the subscriber over SD-WAN service 101. Cloud service 116 may be, for instance, Software as a Service (SaaS), Platform as a Service (PaaS), Infrastructure as a Service (IaaS), Storage as a Service, or other type of cloud service. Cloud service 116 may be offered by infrastructure of cloud 114.

Internet 118 represents the web and/or an Internet-connected service offered via the web. SD-WAN edge 108B, in this example, includes an Internet breakout 120 and assigns application flows to Internet breakout 120 by policy.

Each of SD-WAN edges 108 includes a physical network function or virtual network function for implementing SD-WAN service 101. In various examples, each of SD-WAN edges 108 may be, for instance, one or more VNFs or a PNF located within any of a service provider data center, provider hub, customer premises, or cloud provider premises. Each of SD-WAN edges 108 may be a router, security device such as a firewall, a gateway, a WAN acceleration device, a switch, a cloud router, a virtual gateway, a cloud virtual gateway, an SD-WAN device, or other device that implements aspects of SD-WAN service 101.

In various examples, each of SD-WANs edges 108 may be an on-premises spoke that is a PNF placed at a subscriber branch site in either a hub—and—spoke or full mesh topology; a cloud spoke that is a VNF located in a subscriber's virtual private cloud (VPC) (or equivalent term) within a public cloud; a PNF or VNF located in a service provider cloud operating as a hub device to establish tunnels with the spoke sites (hub devices are multi-tenant, i.e., shared amongst multiple sites through the use of virtual routing and forwarding instances configured thereon); a PNF or VNF located at an enterprise and operating as an enterprise hub to provide additional hub-like capabilities to a normal spoke site (e.g., act as anchor point for spokes for dynamic virtual private network (VPN) creation, provide an on-premises central breakout option, host a data center department, import routing protocol routes to create a dynamic LAN segment, and meshing with other enterprise hubs that belong to the same tenant/subscriber). Each of SD-WAN edges may be located at the location of any of sites 106, hub 112, cloud 114, or cloud service 116.

SD-WAN edges 108 are logically located at the boundary between the provider SD-WAN service 101 and the subscriber network. SD-WAN edges 108 have network-side interfaces for the underlay connection and subscriber-side interfaces for communication with the subscriber network. As noted above, SD-WAN edges 108 may have multiple paths to each other (diverse underlay connections). For example, in a hub-and-spoke deployment, SD-WAN edge 108A has multiple paths, each via a different one of transport networks 110, to SD-WAN edge 108C of hub 112. Interfaces of SD-WAN edges 108 may primarily be used for underlay connections for user data traffic, but interfaces may also be used for management traffic to, e.g., send WAN link characterization data 130 to service orchestrator 102 and, in some aspects, network analysis system 124, and to receive policies, device configurations, and other configuration data from service orchestrator 102.

Service orchestrator 102 may provision and establish overlay tunnels between SD-WAN edges 108 to realize a SD-WAN service 101 topology. In the example of FIG. 1, any of WAN links 142 may be implemented in part using a point-to-point overlay tunnel, e.g., for a virtual private network. Overlay tunnels inherit the performance characteristics of the underlying underlay connection. Overlay tunnels may be encrypted or unencrypted. SD-WAN edges 108 may use any of a variety of encapsulation types, such as MPLS, MPLSoGRE, IP-in-IP, MPLSoUDP, MPLSoGREoIPSec, IPSec, GRE, to implement overlay tunnels.

SD-WAN edges 108 use WAN links 142 to send application traffic across the SD-WAN service 101 to other SD-WAN edges 108. WAN links 142 typically but do not necessarily traverse different underlay connections between SD-WAN edges 108. N WAN links 142A-A-142A-N connect SD-WAN edge 108A and SD-WAN edge 108C. In the example of FIG. 1, each of WAN links 142A-A-142A-N traverses a different one of transport networks 110. Similarly, N WAN links 142N-A-142N-N connect SD-WAN edge 108B and SD-WAN edge 108C, each via a different one of transport networks 110. In a full mesh topology (not shown), additional WAN links would connect SD-WAN edges 108A, 108B. WAN links 142 may also be referred to as "overlay connections," "virtual connections," "tunnel virtual connections," "SD-WAN links," or other terminology that describes WAN links for realizing an SD-WAN service.

Service orchestrator 102 may use SD-WAN controller 104 to deploy SD-WAN service 101 in various architectural topologies, including mesh and hub-and-spoke. A mesh topology is one in which traffic can flow directly from any site 106 to another other site 106. In a dynamic mesh, SD-WAN edges 108 conserve resources for implementing full-mesh topologies. All of the sites in the full mesh are included in the topology, but the site-to-site VPNs are not brought up until traffic crosses a user-defined threshold called the Dynamic VPN threshold. Sites in the mesh topology may include sites 106, cloud 114, and/or cloud service 116.

In a hub-and-spoke topology, all traffic passes through hub 112, more specifically, through SD-WAN edge 108C deployed at hub 112. By default, traffic to the Internet also flows through provider hub 112. In a hub-and-spoke topology, network services (e.g., firewall or other security services) may be applied at the central hub 112 location, which allows all network traffic for SD-WAN service 101 to be processed using the network services at a single site. SD-WAN service 101 may have a regional hub topology that combines full mesh and hub-and-spoke using one or more regional hubs that connect multiple spokes to a broader mesh.

In some examples, SD-WAN controller 104 includes a route reflector (not shown) to facilitate routing in SD-WAN service 101. The route reflector forms overlay Border Gateway Protocol (BGP) sessions with SD-WAN edges 108 to receive, insert, and reflect routes.

SD-WAN edges 108 receive ingress network traffic from corresponding subscriber sites and apply SD-WAN service 101 to forward the network traffic via one of the WAN links 142 to another one of SD-WAN edges 108. SD-WAN edges 108 receive network traffic on WAN links 142 and apply SD-WAN service 101 to, e.g., forward the network via one of the WAN links 142 to another one of SD-WAN edges 108 (where the SD-WAN edge is a hub) or to the destination subscriber site.

To apply SD-WAN service 101, SD-WAN edges 108 process network traffic according to routing information, policy information, performance data, and service characteristics of WAN links 142 that may derive at least in part from performance, bandwidth constraints, and behaviors of the underlay connections. SD-WAN edges 108 use dynamic path selection to steer network traffic to different WAN links 142 to attempt to meet QoS/QoE requirements defined in SLAs and configured in SD-WAN edges 108 for SD-WAN service 101, or to route around failed WAN links, for example. For example, SD-WAN edge 108A may select WAN link 142A-A that is a low-latency MPLS path (in this example) for VoIP traffic, while selecting WAN link 142A-N that is a low-cost, broadband Internet connection for file transfer/storage traffic. SD-WAN edges 108 may also apply traffic shaping. The terms "link selection" and "path selection" refer to the same operation of selecting a WAN link for an application and are used interchangeably.

SD-WAN edges 108 process and forward received network traffic for SD-WAN service 101 according to policies and configuration data from service orchestrator 102, routing information, and current network conditions including underlay connection performance characteristics. In some examples, service orchestrator 102 may push SLA parameters, path selection parameters and related configuration to SD-WAN edges 108, and SD-WAN edges 108 monitor the links to determine WAN link characterization data 130. SD-WAN edges 108 can determine whether to switch an application to a different one of WAN links 142 based on the WAN link characterization data 130.

In some aspects, SD-WAN edges 108 can determine to switch an application to a different WAN link when the WAN link characterization 130 indicates SLA violations are detected. In some aspects, an SD-WAN edge can determine if the SLA violation is likely to continue, and can determine to switch the application to a different one of WAN links 142 when the SLA violation is likely to continue past a predetermined of configurable tolerance interval. For example, in some aspects, an SD-WAN edge can send WAN link characterization data 130 to network analysis system 124 and receive an indicator 132 of a predicted performance metric of the WAN link.

The indicator 132 of a predicted performance metric of a WAN link may be expressed in various ways. For example, the indicator 132 may be a predicted future value of a performance metric included in the WAN link characterization data. The indicator 132 may be a vector of predicted future values of performance metrics included in the WAN link characterization data. The indicator 132 may be a probability value that the WAN link will become unstable at a time in the future. The indicator 132 can be a vector of probability values associated with the performance metrics that indicates the probability that a performance metric associated with the probability value will violate an SLA parameter. Indicator 132 may be a directive or configuration data to cause one or more SD-WAN edges 108 to perform a WAN link switchover. SD-WAN edges 108 may thereby implement the data plane functionality of SD-WAN service 101 over the underlay connections including, in such examples, application switching to different WAN links 142 for application QoE.

In some aspects, if there is an SLA violation detected by one of SD-WAN edges 108, the SD-WAN edge may report and send log messages to service orchestrator 102 describing the SLA violation and the selected WAN link. In some aspects, the SD-WAN edge may report whether or not the SD-WAN edge switched an application to a different WAN link as a result of the SLA violation.

SD-WAN edges 108 may also aggregate, optionally average, and report WAN link characterization data 130 to service orchestrator 102. In some examples, service orchestrator 102 may receive WAN link characterization data from SD-WAN edges 108, and determine whether or not to perform path selection to select a new one of WAN links 142 for an application. Service orchestrator 102 can determine whether to switch an application to a different one of WAN links 142 based on the WAN link characterization data 130. In some aspects, service orchestrator 102 can determine to switch an application to a different WAN link when the WAN link characterization 130 indicates SLA violations are detected. In some aspects, service orchestrator 102 can determine if the SLA violation is likely to continue, and can determine to switch the application to a different one of WAN links 142 when the SLA violation is likely to continue past a predetermined of configurable tolerance interval. For example, in some aspects, service orchestrator 102 can send WAN link characterization data 130 to network analysis system 124 and receive an indicator 132 of a predicted performance metric of the WAN link from network analysis system 124.

WAN link characterization data analysis, SLA evaluation, path selection, and link switching functionality are all performed by SD-WAN system 100, but different examples of SD-WAN system 100 may have a different distribution of control plane functionality between service orchestrator 102, SD-WAN edges 108, and network analysis system 124 than those examples just described. Techniques described herein with respect to QoE are similarly applicable to QoS, etc.

SD-WAN edges 108 may forward traffic based on application flows. Packets of application flows can be identified using packet characteristics, such as layer 3 and layer 4 (e.g., TCP, UDP) header fields (e.g., source/destination layer 3 addresses, source/destination ports, protocol), by deep packet inspection (DPI), or other flow identification techniques for mapping a packet to an application or, more specifically, an application flow. An application flow may include packets for multiple different applications or application sessions, and a single application may be split among multiple application flows (e.g., separate video and audio streams for a video conferencing application).

SLAs may specify applicable application flows and may include policies for application flow forwarding. SD-WAN edges 108 may identify application flows and apply the appropriate policies to determine how to forward the application flows. For example, SD-WAN edges 108 may use application-specific QoE and advanced policy-based routing (APBR) to identify an application flow and specify a path for the application flow by associating SLA profiles to a routing instance on which the application flow is to be sent. The routing instance may be a virtual routing and forwarding instance (VRF), which is configured with interfaces for the WAN links 142.

Configuring service orchestrator 102 to cause SD-WAN system 100 to apply QoE for SD-WAN service 101 may involve configuring multiple profiles of various profile types that enable the user to parameterize QoE for various applications application groups having traffic transported by SD-WAN service 101. A profile typically includes human-readable text that defines one or more parameters for a function or associates the profile with other profiles to parameterize higher-level functions. In various examples, service orchestrator 102 may offer a variety of configuration schemes for parameterizing QoE for SD-WAN service 101.

A subscriber can interact with service orchestrator 102 to create an SLA profile for an application, referred to herein as an "application SLA profile" or simply an "SLA profile." An SLA profile may include SLA configuration data, such as a traffic type profile, an indication of whether local breakout is enabled, a path preference (e.g., an indication of a preferred WAN link of WAN links 142 or type of WAN link (e.g., MPLS, Internet, etc.)), an indication of whether failover is permitted when an active WAN link has an SLA violation of the SLA profile, the criteria for failover (e.g., violation of any SLA parameters or violation of all SLA parameters required to trigger failover). The SLA profile may further include time intervals such as a tolerance interval and a session interval. The tolerance interval may be specified as the length of time the application or service is willing to tolerate network instability before determining to switch to a different WAN link. The session interval may be specified as the length of time that the session is expected to last. Examples of the tolerance interval and session interval are discussed below with respect to FIGS. 5A and 5B.

SLA parameters may be included in an SLA metric profile that is associated with or otherwise part of an SLA profile. Service orchestrator 102 uses SLA parameters to evaluate the SLA of WAN links 142. SLA parameters may include parameters such as throughput, latency, jitter, jitter type, packet loss, round trip delay, time to first packet, average session length, packet retransmission rate, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet. Time to first packet for a session may be specified as the time required to detect the acknowledgement of the first packet that contains the data payload after a client device and a service instance have completed the TCP handshake for the session. Average session length is the average time period that a session or application is active. Packet retransmission rate may be specified as a measurement of the number of times a packet had to be retransmitted to its destination.

An SLA profile may further specify SLA sampling parameters and rate limiting parameters. Sampling parameters may include session sampling percentage, SLA violation count, and sampling period. Session sampling percentage may be used to specify the matching percentage of sessions for which service orchestrator should collect WAN link characterization data 130. SLA violation count may be used to specify the number of SLA violations after which SD-WAN system 100 should determine whether or not to switch to a different one of WAN links 142. Sampling period may be used to specify the sampling period for which the SLA violations are counted.

Rate limiting parameters may include maximum upstream rate, maximum upstream burst size, maximum downstream rate, maximum downstream burst size, and loss priority. Maximum upstream rate may be used to specify the maximum upstream rate for all applications associated with the SLA profile. Maximum upstream burst size may be used to specify the maximum upstream burst size for all applications associated with the SLA profile. Maximum downstream rate may be used to specify the maximum downstream rate for all applications associated with the SLA profile. Maximum downstream burst size may be used to specify the maximum downstream burst size for all applications associated with the SLA profile. Loss priority may be used to select a loss priority based on which packets can be dropped or retained when network congestion occurs. The probability of a packet being dropped by the network is higher or lower based on the loss priority value.

An application SLA profile may be specified using an SLA rule that includes all required information to measure SLA and to identify whether any SLA violation has occurred or not. An SLA rule may contain the time period in which the profile is to be applied, preferred SLA configuration, and other SLA parameters described above (e.g., SLA sample parameters, rate limiting parameters, metrics profile, tolerance intervals, session intervals etc.). An SLA rule is associated with an application or application group and to become its SLA profile. In other words, an SLA profile for an application may be a particular SLA rule (e.g., "SLA3") as configured in service orchestrator 102. In some cases, the SLA rule may be associated in this way by association with an APBR rule that is matched to an identified application or application group. As noted above, in some examples, service orchestrator 102 may push SLA parameters, path selection parameters, routing information, routing and interface data, interval data, and related configuration to SD-WAN edges 108, and SD-WAN edges 108 monitors the links for SLA violations. As noted above, SD-WAN edges 108 can use such data and parameters to determine whether or not to switch an application to a different one of WAN links 142.

SLA violations occur when the performance of a WAN link is below acceptable levels as specified by the SLA. To attempt to meet an SLA, SD-WAN system 100 may monitor the network for sources of failures or congestion. If SD-WAN system 100 determines an SLA violation has occurred for a WAN link, SD-WAN system 100 may determine whether to select an alternate path having a WAN link 142 that satisfies the SLA. For example, SD-WAN system 100 may determine, based on an indicator 132 of a predicted performance metric of the WAN link, whether the SLA violation is likely to continue beyond a predetermined or configurable tolerance interval, and if so, can determine to reassign an application to a different WAN link.

An overlay path includes the WAN links 142 that are used to send the application traffic for an application. SD-WAN system 100 may assign applications to a particular WAN link 142 based on the SLA metrics of the WAN link 142. A destination group is a group of multiple overlay paths terminating at a destination.

In general, service orchestrator 102 configures SD-WAN edges 108 to recognize application traffic for an application, and service orchestrator 102 specifies paths for certain traffic by associating SLA profiles to routing instances by which SD-WAN edges 108 send application traffic to satisfy rules of an APBR profile.

APBR enables application-based routing by service orchestrator 102 that is managing SD-WAN edges 108. An APBR profile specifies matching types of traffic, e.g., by listing one or more applications or application groups. The APBR profile may include multiple APBR rules that each specifies one or more applications or application groups. If network traffic matches a specified application, the rule is considered a match. An SLA rule may be associated with a APBR rule to specify how matching traffic should be handled for QoE. An APBR rule may also specify a routing instance to be used by SD-WAN edges 108 to route traffic matching the APBR rule. The routing instance may have interfaces for one or more WAN links 142. Service orchestrator 102 configures SD-WAN edges 108 with an APBR profile (or configuration data derived therefrom) to cause SD-WAN edges 108 to use APBR in accordance with the APBR profile to implement SD-WAN service 101.

In some examples, SD-WAN edges 108 (e.g., SD-WAN edge 108A) process packets received on an interface to identify the application for the packets. SD-WAN edge 108A may apply an APBR profile to attempt to match the application to an APBR rule therein. If a matching APBR rule is not found, SD-WAN edge 108A forwards the packets normally. If a matching APBR rule is found, however, SD-WAN edge 108A uses the routing instance specified in the APBR rule to route the packets.

A routing instance has associated interfaces for one or more links used by the routing instance to send and receive data. The routing instance, configured in SD-WAN edges 108 and which may be associated with an APBR rule, has interfaces for WAN links 142 to send and receive application traffic. These interfaces may be interfaces for underlay connections.

SD-WAN edges 108 may route traffic using different links based on the link preference determined using SLA rules 122. In some examples, multiple WAN links 142 may meet SLA requirements for an application. SD-WAN system 100 may select, from these multiple WAN links 142, the WAN link that matches a link preference configured by the user. This preference may be based at least in part on link type and link priority for the WAN links 142. For example, for SD-WAN edge 108A, SD-WAN system 100 may select one of WAN links 142A-142A-N that matches the preferred link type (e.g., MPLS) to reach SD-WAN edge 108C. If there are multiple such WAN links 142 with this preference, the WAN link with the highest priority among them is selected. If there is no priority or link type preference configured, then a random path or the default path is selected. If no WAN links 142 that meet the SLA requirements are available, then the best available WAN link in terms of the highest SLA score and link type preference, where strict affinity is configured, is selected. If multiple WAN links 142 that meet the SLA requirements are available, then the one with the highest priority is selected. One or more of the WAN links 142 may be configured with a priority, which may be expressed in the configuration as an integer value that represents the priority. Service orchestrator 102 prefers higher-priority WAN links 142 over lower-priority WAN links 142. Further details on selection of WAN links according to SLA and SLA rules can be found in U.S. patent application Ser. No. 17/139,695, entitled "WAN LINK SELECTION FOR SD-WAN SERVICES" and filed on Dec. 31, 2020, the entire contents of which is hereby incorporated by reference herein.

As discussed above, SD-WAN system 100 may monitor WAN links in the network to determine SLA violations and/or predicted future performance of WAN links 142. SD-WAN system 100 may further monitor WAN links in the network for indications of network failure or network degradation, for example, degradation due to congestion in the network. In some aspects, SD-WAN edge 108 sends WAN link characterization data 130 to network analysis system 124. In some aspects, SD-WAN edge 108 may send the WAN link characterization data 130 directly to network analysis system 124. In some aspects, SD-WAN edge 108 may send the WAN link characterization data 130 to SD-WAN controller 104, and network analysis system 124 can receive the WAN link characterization data from SD-WAN controller 104. The WAN link characterization data can be used to determine indicator 132 of a predicted performance metric of the WAN link.

In the event that the indicator of the predicted performance metric indicates that there may be an SLA violation or other network degradation, SD-WAN system 100 may determine whether or not to reassign the WAN link that is predicted to experience the degradation or SLA violation to a different WAN link that is not experiencing (or not predicted to experience) degradation or an SLA violation. In some aspects, SD-WAN system 100 can use algorithms and heuristics to determine an indicator of a predicted performance metric. This indicator can be used to determine whether or not to reassign an application from one WAN link to another. The algorithms and heuristics can utilize artificial intelligence (AI) techniques and/or machine learning models to determine whether or not to reassign an application from one WAN link to another. As will be further described below, SD-WAN system 100 can use AI techniques to predict whether the instability in the currently selected WAN link will continue long enough to make a switch to different WAN link desirable and efficient. If SD-WAN system 100 predicts that the instability in the currently selected WAN link will be longer than tolerable, SD-WAN system 100 can reassign an application from a current WAN link to a different WAN link. If SD-WAN system 100 predicts that the episode of network instability will end within a tolerable time interval, SD-WAN system 100 can maintain the current assignment of the WAN link for the application.

Figure 2A:
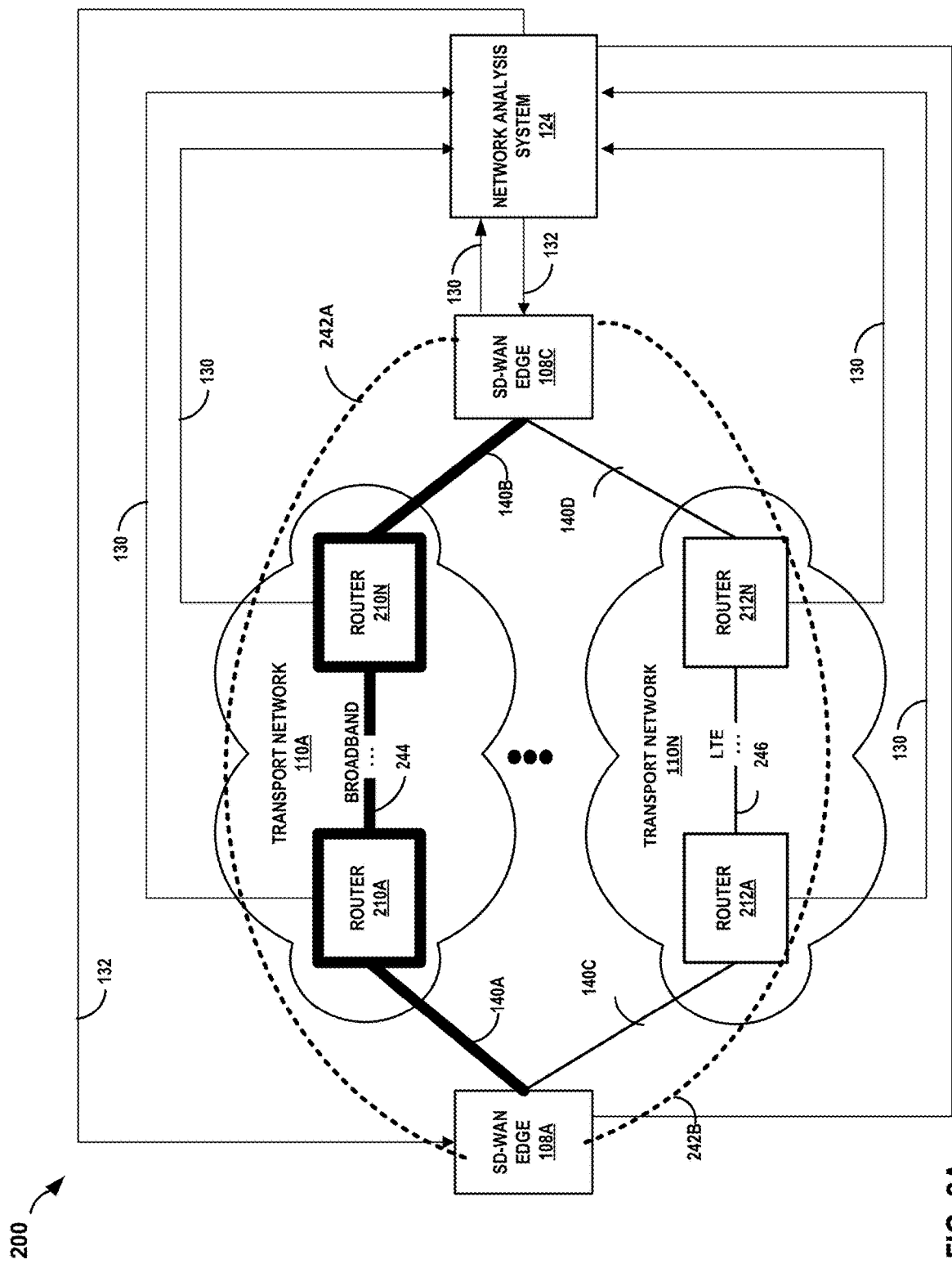
FIGS. 2A and 2B are block diagrams illustrating a conceptual view of WAN link selection and switchover, according to techniques described in this disclosure.
Figure 2B:
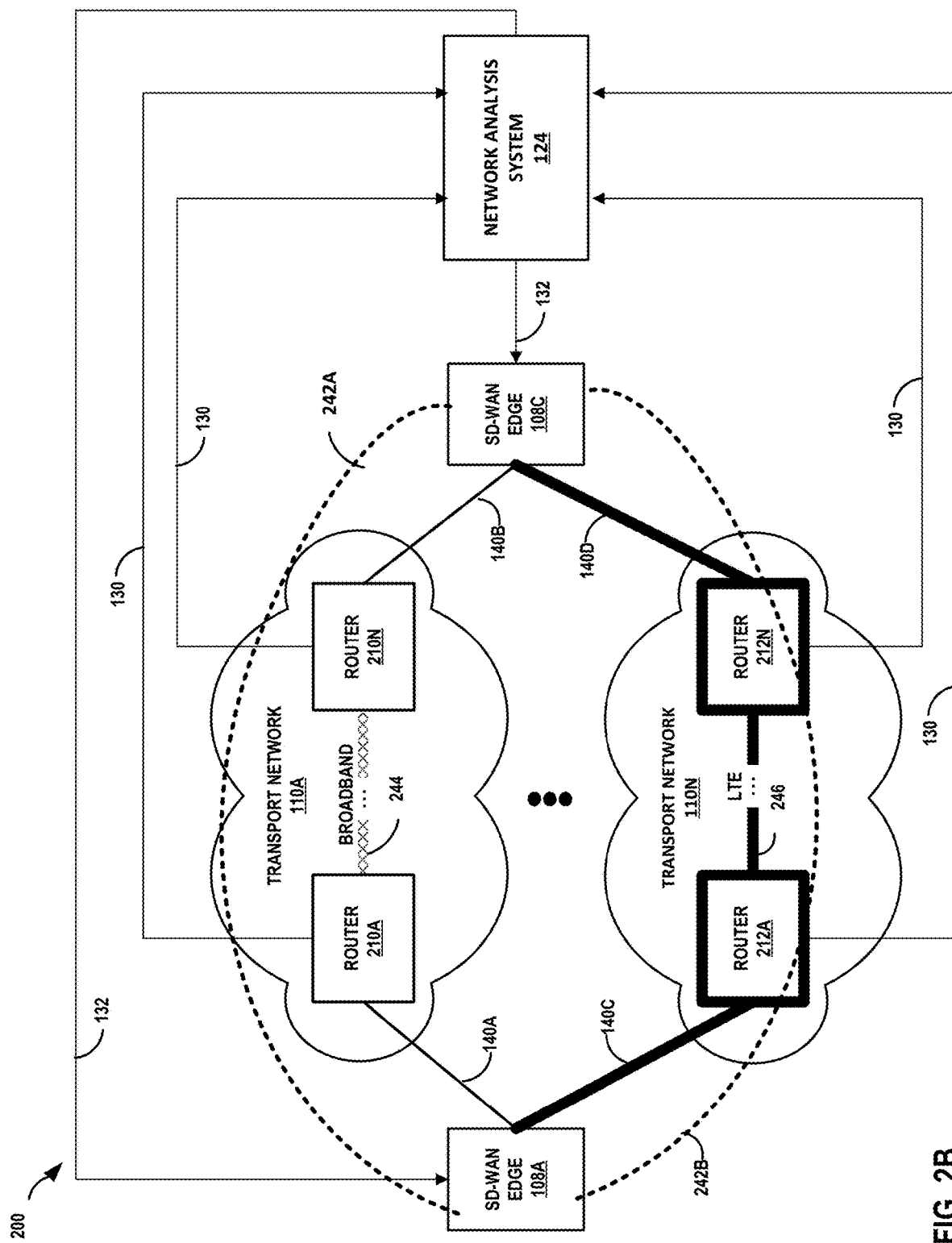

FIGS. 2A and 2B are block diagrams illustrating conceptual views of WAN link selection and reassignment, according to techniques described in this disclosure. FIGS. 2A and 2B illustrate an example portion 200 of a network system such as example network system 100 of FIG. 1, and includes SD-WAN edges 108A and 108B, transportation networks 110A-110N, and network analysis system 124. In this example, transportation network 110A includes broadband routers 210A-210N communicatively coupled via broadband network 244. Transportation network 110N includes LTE routers 212A-212N communicatively coupled via LTE network 246. SD-WAN edges 108A and 108B and broadband routers 210A-210N may provide WAN link characterization data 130 to network analysis system 124 (and/or an SD-WAN controller not shown in FIGS. 2A and 2B). Routers 210, 212 may be collectively referred to as "intermediate routers" or "transport network routers," in that such routers are not edge routers for the WAN links of network system 100 but instead transport application packets across the transport networks 110 as part of the underlay.

FIG. 2A shows an example WAN link selection for SD-WAN edge 108A. In this example, SD-WAN system 100 has initially selected WAN link 242A for communication between SD-WAN edge 108A and SD-WAN edge 108B. WAN link 242A can be any of WAN links 142 described with respect to FIG. 1. In this example, WAN link 242A includes transportation network 110A, which in turn includes routers 210A-210N that communicate over broadband network 244. Thus, in the initial selection, WAN link 242A from SD-WAN edge 108A to SD-WAN edge 108B includes network link 140A, transportation network 110A including routers 210A-210N, and network link 104B. This network path is indicated in FIG. 2A using bolded lines. SD-WAN system 100 may use various methods to select a WAN link, including those described in U.S. patent application Ser. No. 17/139,695, entitled "WAN LINK SELECTION FOR SD-WAN SERVICES" and filed on Dec. 31, 2020, which has been previously incorporated by reference.

FIG. 2B shows an example WAN link reassignment for SD-WAN edge 108A. As noted above, during the course of network operations, SD-WAN edges 108A and 108B, broadband routers 210A-210N, and LTE routers 212A-212N, among others, can provide WAN link characterization data 130 to network analysis system 124. Network analysis system 124 receives the WAN link characterization data 130, and based on such data, can generate an indicator 132 of a predicted performance metric of the WAN link. For example, network analysis system 124 may utilize artificial intelligence or other heuristics to determine the indicator 132 of the predicted performance metric. For the purposes of the example illustrated in FIG. 2B, network analysis system 124 has generated an indicator 132 of a predicted performance metric that indicates that broadband network 244 of WAN link 242A will experience network instability in at a future time. SD-WAN edge 108A receives the indicator 132 of a predicted performance metric of the WAN link 242A, and in response to determining that the indicator 132 indicates the future instability of broadband network 244, may reassign an application currently using WAN link 242A from WAN link 242A to WAN link 242B. The reassigned network path of WAN link 242B is indicated in FIG. 2B using bolded lines.

Figure 3:
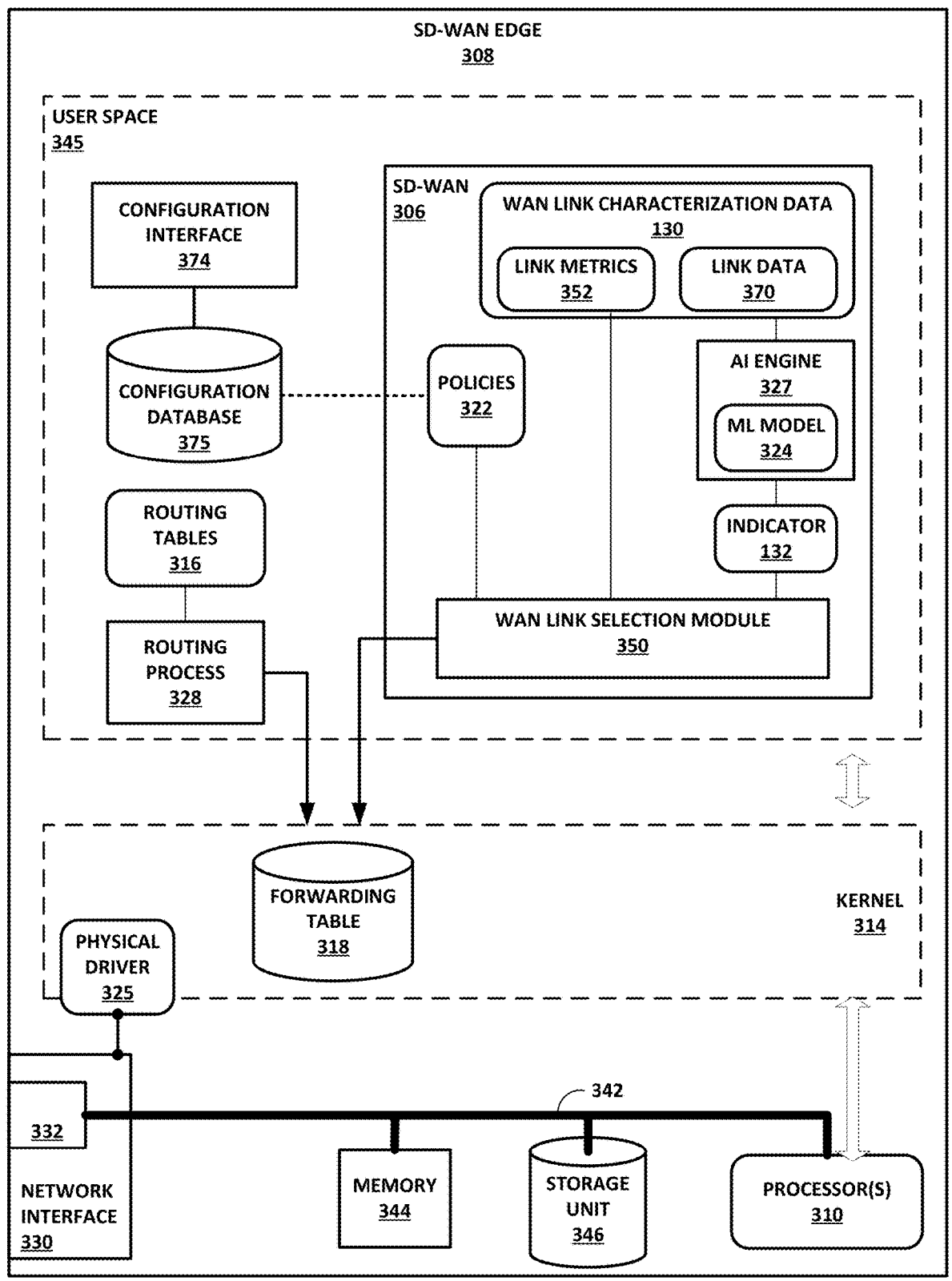
FIG. 3 is a block diagram illustrating an example SD-WAN edge device in further detail, according to techniques described in this disclosure.

FIG. 3 is a block diagram illustrating an example SD-WAN edge device in further detail, according to techniques described in this disclosure. SD-WAN edge device 308 ("SD-WAN edge 308") may represent any of SD-WAN edges 108 of FIGS. 1 and 2. SD-WAN edge 308 is a computing device and may represent a PNF or VNF. SD-WAN edge 308 may include one or more real or virtual servers configured to execute one or more VNFs to perform operations of an SD-WAN edge.

SD-WAN edge 308 includes in this example, a bus 342 coupling hardware components of a hardware environment. Bus 342 couples network interface card (NIC) 330, storage unit 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Processor(s) 310 may include one or more processors each including an independent execution unit comprising processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Storage unit 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 310.

Memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory. Interfaces 332 may be interfaces for underlay connections of WAN links configured for SD-WAN application 306 between SD-WAN edge 308 and one or more other SD-WAN edges.

Memory 344, NIC 330, storage unit 346, and processor(s) 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 that provides a software interface facilitating the use NIC 330 by kernel 314 and processes in user space 345.

The hardware environment and kernel 314 provide a user space 345 operating environment for SD-WAN edge 308 applications, including routing process 328, configuration interface 374, and SD-WAN application 306. Configuration interface 374 enables SD-WAN controller 104 (FIG. 1) or an operator to configure SD-WAN edge 308. Configuration interface 374 may provide a NETCONF interface, Simple Network Management Protocol (SNMP), a command-line interface, a RESTful interface, Remote Procedure Calls, or other interface by which remote devices may configure SD-WAN edge 308 with configuration information stored to configuration database 375. Configuration information may include, e.g., policies 322. Policies 322 may include SLA rules that partially define operation of WAN link switching module 350 for SD-WAN application 306, routes, and virtual routing and forwarding instances (VRFs) configured with interfaces for WAN links, interfaces configurations that specify link type (IP, MPLS, mobile, etc.), priority, maximum bandwidth, encapsulation information, type of overlay tunnel, and/or other link characteristics.

Routing process 328 executes routing protocols to exchange routing information (e.g., routes) with other network devices and uses the routing information collected in routing table(s) 316 to select the active route to each destination, which is the route used by SD-WAN edge 308 to forward incoming packets to that destination. To route traffic from a source host to a destination host via SD-WAN edge 308, SD-WAN edge 308 learns the path that the packet is to take. These active routes are inserted into the forwarding table 318 of SD-WAN edge 308 and used by the forwarding plane hardware for packet forwarding. For example, routing process 328 may generate forwarding table 318 in the form of a radix or other lookup tree to map packet information (e.g., header information having destination information and/or a label stack) to next hops and ultimately to interfaces 332 for output. In some examples, SD-WAN edge 308 may have a physically bifurcated control plane and data plane in which a switching control card manages one or more packet forwarding line cards each having one or more high-speed packet processors.

SD-WAN edge 308 executes SD-WAN application 306 to implement an SD-WAN service, such as SD-WAN service 101 of FIG. 1. SD-WAN application 306 causes SD-WAN edge 308 to forward traffic based on application flows. SD-WAN application 306 may identify packets of different application flows packets using packet characteristics. Once an application is identified using initial packet(s), information for identifying traffic for application sessions may be stored in flow tables for faster processing. WAN link switching module 350 selects WAN links to assign applications according to routing information, policy information, performance data, and service characteristics of the WAN links for an SD-WAN service implemented by SD-WAN application 306. SD-WAN application 306 may program forwarding table 318 with selected WAN links for applications, flow table data, or other data for mapping application traffic to a selected WAN link Although termed and described as an application, SD-WAN application 306 may represent one or more processes, scripts, utilities, libraries, or other programs for performing SD-WAN edge operations.

SD-WAN edge 308 may be configured with policies 322 that may define criteria for WAN link selection. In some aspects, the criteria may be expressed as rules that determine how an application is assigned to a WAN link SD-WAN edge 308 may use the criteria to assign applications to WAN links. As an example, a high priority application may be assigned to a high priority link, while lesser priority applications may be assigned to lesser priority links.

SD-WAN edge 308 may select a WAN link for an application based in part on available bandwidths on the WAN links for an SD-WAN service that are acceptable based on the SLA for the application. For example, SLA rules of policies 322 may be associated with one or more SLA metrics that determine the SLA for applications that match the SLA rule. SD-WAN can gather WAN link characterization data 130 such as link metrics 352 that indicate values of various performance metrics for each of the WAN links. WAN link characterization data 130 can include link data 370 that indicates bandwidth usage of each of the WAN links. SD-WAN application 306 can compute available bandwidth for each of the WAN links. To obtain link data 370 for computing bandwidth usage, SD-WAN application 306 may obtain statistics for interfaces 332, such as interface bandwidth usage statistics. WAN link switching module 350 further selects WAN links to assign applications according to available bandwidth for the WAN links.

In some implementations, SD-WAN application 306 may optionally include an AI engine 327. AI engine can receive and analyze WAN link characterization data 130 determined by SD-WAN edge device 308 and process the WAN link characterization data 130 to generate an indicator 132 of a predicted performance metric of a WAN link. Machine learning model 324 can be a model that has been previously trained to generate the indicator 132 of a predicted performance metric. Machine learning model 324 may be trained using supervised or unsupervised machine learning techniques. In some examples, any of AI engine 327 and machine learning model 324 may implement a neural network. In some examples, AI engine 327 may generate and utilize Bayesian statistics to generate indicator 132 of a predicted performance metric. Further details on training machine learning model 324 are provided below with respect to FIG. 5A. In some cases, aspects of any of AI engine 327 and ML model 324 may be provided off-device from SD-WAN edge by a remote service. In such examples, SD-WAN application 306 may query the remote service using WAN link characterization data 130 to obtain indicator 132.

In implementations where SD-WAN application 306 does not include AI engine 327, SD-WAN application 306 may receive the indicator 132 of a predicted performance metric from another component of SD-WAN system 100 (FIG. 1) or a remote service. For example, SD-WAN application 306 may receive indicator 132 of a predicted performance metric of a WAN link from network analysis system 124 (not shown in FIG. 3). In such examples, SD-WAN edge 308 may not collect and store WAN link characterization data 130.

WAN link selection module 350 can utilize indicator 132 of a predicted performance metric of a current WAN link for an application to determine if the application should be reassigned from the current WAN link to a different WAN link. The determination may be performed in response to various events, or periodically, for example. For instance, in some aspects, SD-WAN application 306 may determine (perhaps based on WAN link characterization data 130) that the WAN link currently assigned to an application has violated an SLA threshold. In response to determining that the SLA threshold has been violated, WAN link selection module 350 can determine, based on the indicator of the predicted performance metric associated with the WAN link whether or not the SLA threshold will likely continue to be violated at a future time. The future time may be specified as a tolerance interval. If the indicator of the predicted performance metric associated with the WAN link indicates that the SLA violation will likely continue beyond the tolerance interval, WAN link selection module may select a different WAN link and reassign the application to the newly selected WAN link. If the indicator of the predicted performance metric associated with the WAN link indicates that the SLA threshold will not be violated at the future time (e.g., the issue or issues causing the SLA violation will likely be resolved), the WAN link selection module can bypass selection of a new WAN link, and maintain the current WAN link assignment for the application.

In some aspects, there may not be a current SLA threshold violation, but AI engine 327 may process WAN link characterization data to generate an indicator 132 of a predicted performance metric of a WAN link that indicates the WAN link will likely violate the SLA threshold at a future time. If the duration of the predicted SLA threshold violation is predicted to be longer than the tolerance interval, then WAN link selection module may reassign the WAN link prior to any actual SLA threshold violation.

The tolerance interval may be different from application to application, based on the design and needs of the application. For example, some applications, such as Voice over Internet Protocol (VOIP) applications may be sensitive to network jitter and network disruptions. The tolerance interval for such applications may be very short, for example on the order of 100-500 milliseconds. Other applications, such as background file transfer applications, may not be sensitive to such disruptions. The tolerance interval for such applications may be relatively long, for example, on the order of tens of seconds.

The above-described heuristics that determine whether or not to reassign a WAN link for an application may be implemented as one or more rules of policies 322. The rules may take the indicator 132 of the predicted performance metric associated with a WAN link and a tolerance interval as input parameters, and determine whether or not to reassign an application.

Figure 4:
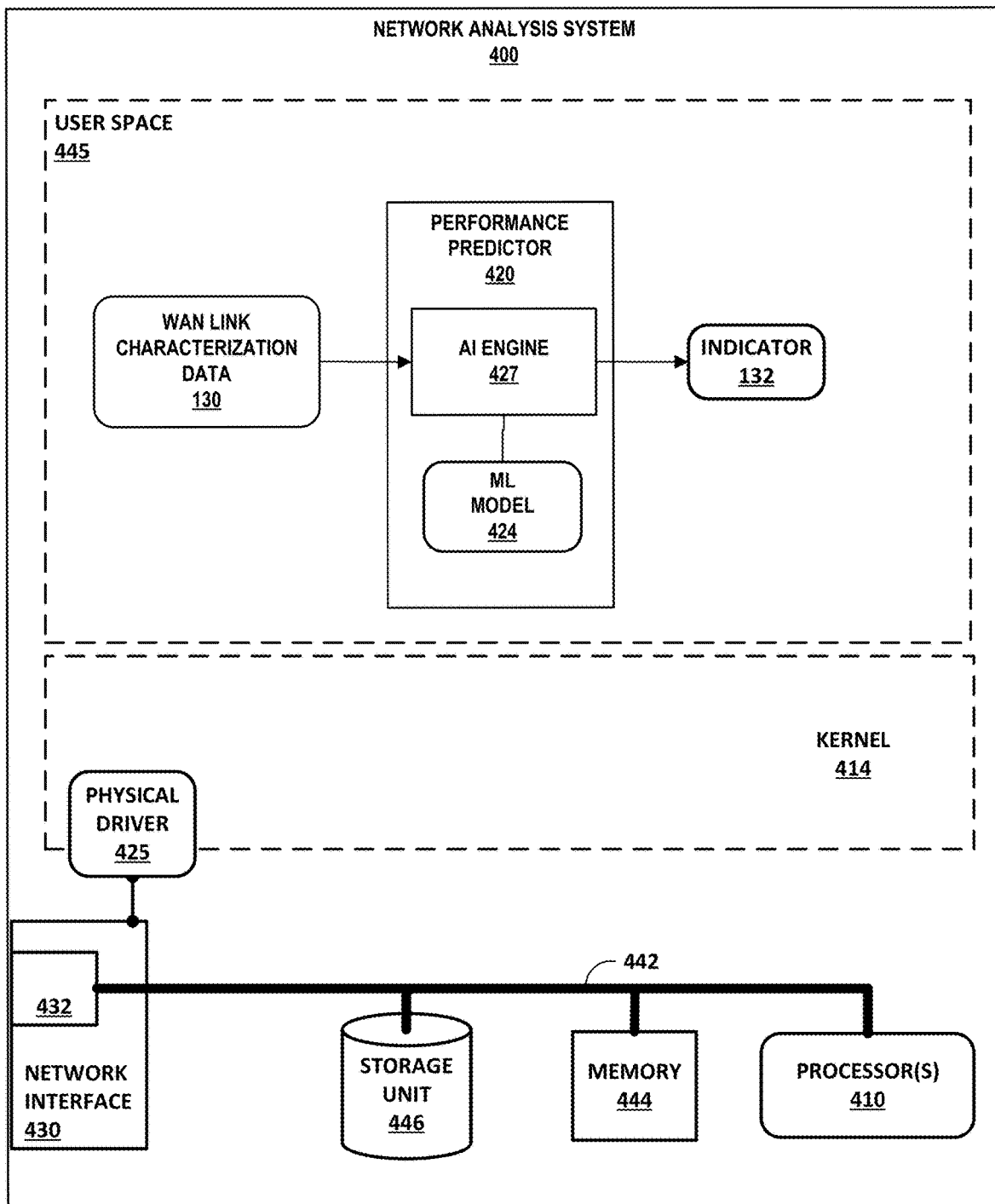
FIG. 4 is a block diagram illustrating a network analysis system, according to techniques described in this disclosure.

FIG. 4 is a block diagram illustrating a network analysis system (NAS), according to techniques described in this disclosure. NAS 400 may be an example implementation of, for example, NAS 124 of FIGS. 1, 2A and 2B. NAS 400 includes in this example, a bus 442 coupling hardware components of a hardware environment. Bus 442 couples NIC 430, storage unit 446, and one or more microprocessors 410 (hereinafter, "microprocessor 410"). A front-side bus may in some cases couple microprocessor 410 and memory device 444. In some examples, bus 442 may couple memory device 444, microprocessor 410, and NIC 430. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 442.

Processor(s) 410 may include one or more processors each including an independent execution unit comprising processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). Processor(s) 410 execute software instructions, such as those used to define a software or computer program, stored to a storage medium (such as memory 444 or storage unit 446). The software instructions can cause processors 410 to perform the techniques described herein.

Storage unit 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 410.

Memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 444 provides a physical address space composed of addressable memory locations.

Network interface card (NIC) 430 includes one or more interfaces 432 configured to exchange packets using links of an underlying physical network. NIC 430 can couple NAS 400 to a network and/or the Internet, such as any of network(s) 110 as shown in FIG. 1, and/or any local area networks. Interfaces 432 may include a port interface card having one or more network ports. Interfaces 432 may include, for example, an Ethernet interface. NIC 430 may also include an on-card memory to, e.g., store packet data. Direct memory access transfers between the NIC 430 and other devices coupled to bus 442 may read/write from/to the NIC memory. NIC 430 receives/transmits data and information to/from any of SD-WAN edges 108, SD-WAN controller 104, routers 210A-210N, routers 212A-212N and/or any other devices or systems forming part of network 100 such as shown in FIGS. 1, 2A and 2B. The data and information received by NAS 400 may include, for example, WAN link characterization data 130 describing the performance and capabilities of WAN links 242 (FIGS. 1, 2A and 2B).

Memory 444, NIC 430, storage unit 446, and microprocessor 410 may provide an operating environment for a software stack that includes an operating system kernel 414 executing in kernel space. Kernel 414 may represent, for example, a Linux, Berkeley Software Distribution (BSD), another Unix-variant kernel, or a Windows server operating system kernel, available from Microsoft Corp. As with kernel 314 described above, the operating system may execute a hypervisor and one or more virtual machines managed by hypervisor. An operating system that includes kernel 314 provides an execution environment for one or more processes in user space 445. Kernel 414 includes a physical driver 425 that provides a software interface facilitating the use NIC 430 by kernel 314 and processes in user space 445.

The hardware environment and kernel 414 provide a user space 445 operating environment for applications such as performance predictor 420. Performance predictor 420 can receive WAN link characterization data 130 from various components of a network system such as network system 100 shown in FIG. 1. For example, performance predictor 420 can receive WAN link characterization data 130 from SD-WAN edges, routers, and other network devices. Performance predictor 420 can utilize WAN link characterization data 130 to determine an indicator 132 of a predicted performance metric of a WAN link Performance predictor 420 can include an AI engine 427. AI engine 427 can receive and analyze WAN link characterization data 130 using machine learning model 424 to generate an indicator 132 of a predicted performance metric based on such data. Machine learning model 424 can be a model that has been previously trained to generate the indicator 132 of the predicted performance metric. Machine learning model 424 may be trained using supervised or unsupervised machine learning techniques. In some examples, AI engine 427 and machine learning model 424 may implement a neural network. In some examples, AI engine 427 may generate and utilize Bayesian statistics to generate indicator 132 of a predicted performance metric. Further details on training machine learning model 424 are provided below with respect to FIG. 5A.

Figure 5A:
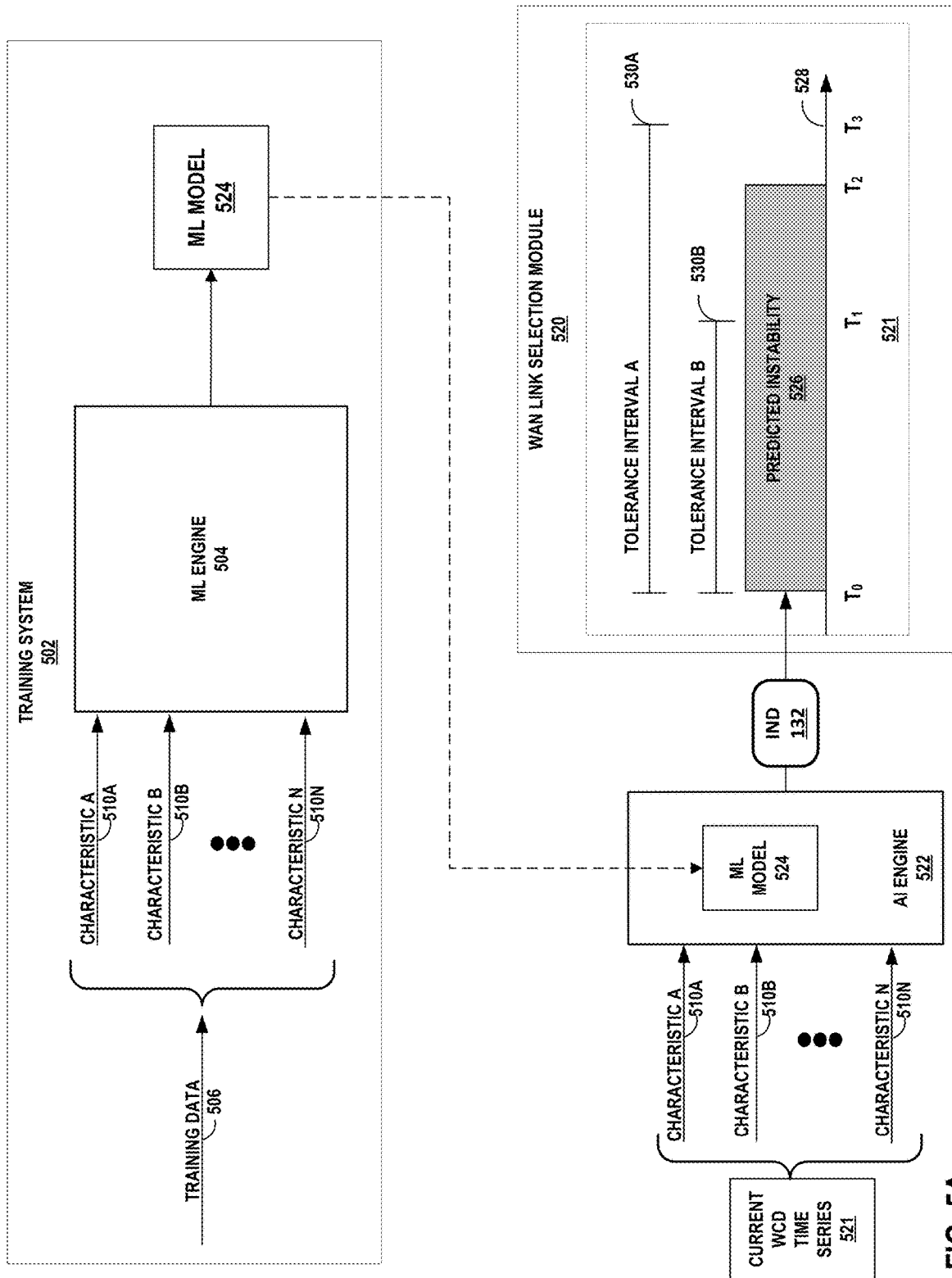
FIGS. 5A and 5B are conceptual views illustrating training and using a machine learning model to generate an indicator of a predicted performance metric of a WAN link in relation to an instability interval, according to techniques described in this disclosure.
Figure 5B:
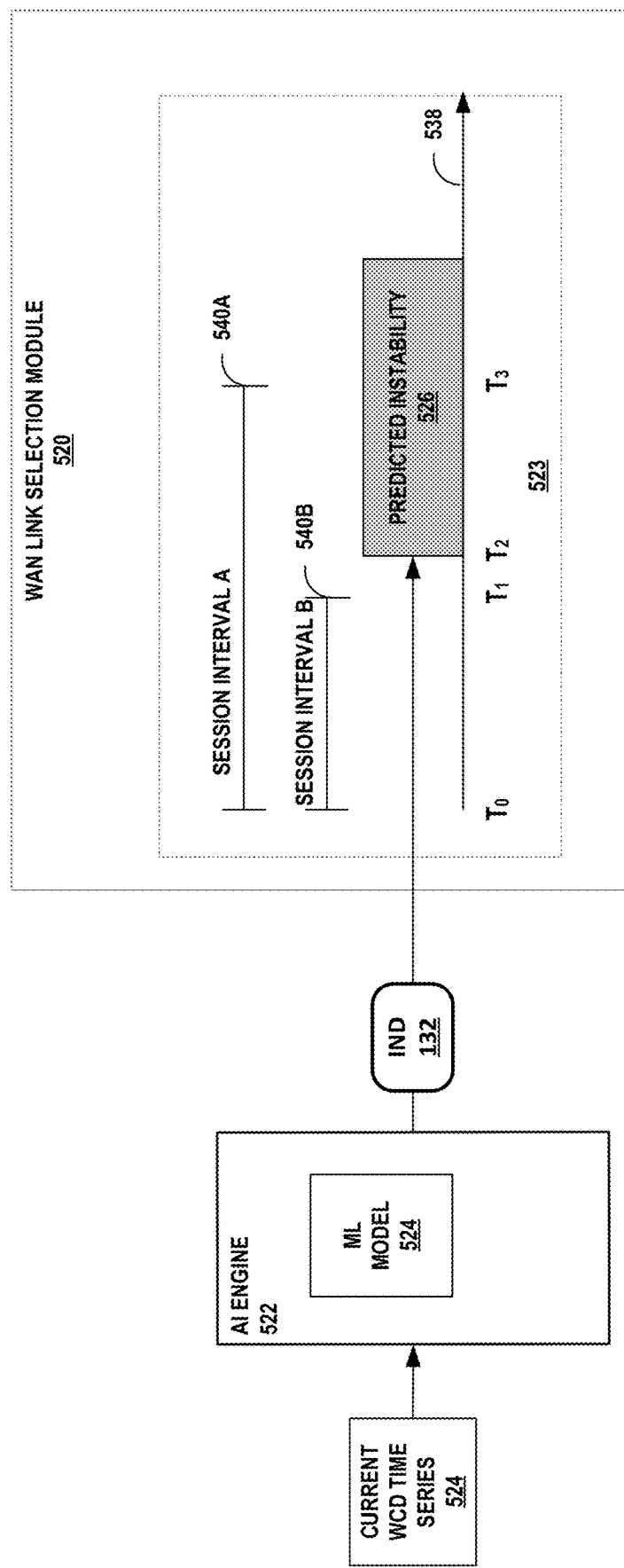

FIGS. 5A and 5B are conceptual views illustrating training and using a machine learning model that provides an indicator of a predicted performance metric of a WAN link in relation to an instability interval, according to techniques described in this disclosure.

FIG. 5A illustrates a training system 502 that is configured to train machine learning model 524 to generate an indicator 132 of future performance for a WAN link, and use of the indicator 132 by a WAN selection module. Training system 502 can include machine learning engine 504 that can be configured to use supervised or unsupervised machine learning techniques to train machine learning model 524 to generate indicator 132 of a predicted performance metric of a WAN link. Machine learning engine 504 can receive training data 506 that can be a time series of WAN link characterization data. In some aspects, training data 506 can be historical WAN link characterization data. Training data 506 for a particular WAN link may include, for instance, values of performance metrics for the WAN link over time.

Historical WAN link characterization data for the WAN link may include independent and dependent variables. Independent variables may include time, dates, application traffic load, network paths, time of day, events, conditions, application identifiers for applications or application types/groups served by the WAN link, any of the characteristics 510 of a WAN link described below, or any other variables or conditions that may affect any performance metric of the WAN link. The primary dependent variables are the performance metrics of the WAN link. Training data 506 may include training data for multiple WAN links. WAN links characterized by training data 506 may be different WAN links, including WAN links for different SD-WAN systems, than those for which prediction is applied. However, because different WAN links may provide similar performance under similar conditions, the techniques permit application of "global" knowledge to local conditions to improve performance of application by intelligent selection of WAN links of an SD-WAN system.

The WAN link characterization data can include characteristics 510A-510N of a WAN link. In some aspects, characteristics 510A-510N can include some or all of performance characteristics, service characteristics, and environment characteristics for a WAN link Performance characteristics can include throughput, latency, jitter, packet loss, time to first packet, average session length, packet retransmission rate, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet. Time to first packet for a session may be specified as the time required to detect the acknowledgement of the first packet that contains the data payload after a client device and a service instance have completed the TCP handshake for the session. Average session length is the average time period that a session or application is active. Packet retransmission rate may be specified as a measurement of the number of times a packet had to be retransmitted to its destination etc.

Service characteristics can include link bandwidth, maximum transmission unit (MTU), etc. Environment characteristics can include device type, timestamp, network interface type etc. Characteristics 510A-510N may be selected manually, for example, by a subject matter expert or automatically, for example, by a feature extractor (not shown in FIG. 5A). A feature extractor may also be used to indicate feature importance. Feature importance can be used to determine important WAN link characteristics, for example, features that have a significant impact in predicting future performance of a WAN link.

After training, machine learning model 524 may be deployed for use by AI engine 522. AI engine 522 may represent AI engine 327 of SD-WAN edge 308 (FIG. 3) and/or AI engine 427 of network analysis system 124 (FIG. 4). During operation, AI engine 522 can receive a current WAN link characterization data time series 521 from SD-WAN edges 108 and the routers of transportation networks 110 (e.g., routers 210 and 212 of FIG. 2), and process the current WAN link characterization data time series 521 using machine learning model 524 to generate indicator 132 of a predicted performance metric. In some aspects, AI engine 522 can receive the same characteristics 510A-510N that were used to train machine learning model 524. As noted above, indicator 132 of a predicted performance metric of a WAN link may be expressed in various ways. For example, the indicator 132 may be a predicted future value of a performance metric generated from, or included in, the WAN link characterization data. The indicator 132 may be a vector of predicted future values of performance metrics generated from, or included in, the WAN link characterization data. The indicator 132 may be a probability value that the WAN link will become unstable at a time in the future. The indicator 132 can be a vector of probability values associated with the performance metrics that indicates the probability that a performance metric associated with the probability value will violate an SLA parameter. Indicator 132 may be provided to a WAN link selection module 520. WAN link selection module 520 can represent WAN link selection module 350 of SD-WAN edge device 308 (FIG. 3).

WAN link selection module 520 can utilize indicator 132 of a predicted performance metric to determine if a period of predicted instability 526 in a WAN link will exceed a tolerance interval associated with the WAN link. As an example, the tolerance interval may be specified by an application assigned to the WAN link. A conceptual view 521 of two tolerance intervals 530A and 530B is shown within WAN link selection module 520. Tolerance interval A 530A may be associated with a first application assigned to a WAN link and tolerance interval 530B may be associated with a second application assigned to the WAN link. Predicted instability interval 526 represents a time interval of network instability that may be determined based on indicator 132 of future network performance, and may start at time $T_0$ on timeline 528 and run through time $T_2$. As shown in conceptual view 521, tolerance interval A 530A of the first application runs to time $T_3$. WAN link selection module 520 may not reassign a WAN link assigned to the first application despite the predicted WAN link instability because the tolerance interval associated with the first application is longer than the period of predicted instability 526. In other words, the first application is able to tolerate the period of predicted instability 526 based on its longer tolerance interval A 530A Thus, WAN link selection module 520 can avoid resource usage and associated costs of reassigning the WAN link associated with the first application.

As shown in conceptual view 521, tolerance interval 530B associated with the second application assigned to the WAN link runs to time $T_1$ and is therefore shorter than the predicted instability interval 526. In this case, WAN link selection module 520 may reassign a different WAN link to application B because application B has indicated that it cannot tolerate network instability that lasts longer than the time period indicated by tolerance interval B 530B.

FIG. 5A illustrates a training system 502 that is configured to train machine learning model 524 to generate an indicator 132 of future performance for a WAN link, and use of the indicator 132 by a WAN selection module.

FIG. 5B illustrates a WAN selection module 520 using an indicator 132 of a predicted performance metric and a session interval to determine WAN link reassignment. A conceptual view 523 of two session intervals 540A and 540B is shown within WAN link selection module 520. In the example illustrated in FIG. 5B, application A may have an associated session interval A 540A and application B may have an associated session interval 540B. A session interval 540A, 540B may be an average session length, a minimum session length, maximum session length etc. In this example, indicator 132 of future network performance may indicate a time $T_2$ when a predicted interval of network instability 526 of a WAN link may begin. WAN link selection module 520 may determine if the session associated with an application may be completed prior to the predicted interval of network instability 526 of a WAN link begins. In the example illustrated in FIG. 5B, session interval 540A starts at time $T_0$ and runs to $T_3$. Time $T_3$ is after time $T_2$, the time when predicted interval of network instability 526 begins. In this example, WAN link selection module 520 may avoid assigning the WAN link to application A, and select a different WAN link.

In the example illustrated in FIG. 5B, session interval 540B associated with application B starts at time $T_0$ and ends at time $T_1$, which is before the time T2 when predicted interval of network instability 526 of the WAN link begins. In this case, WAN selection module may assign the WAN link to application B because the predicted interval of network instability 526 of the WAN link does not begin until after the application B session is predicted to end.

Figure 6:
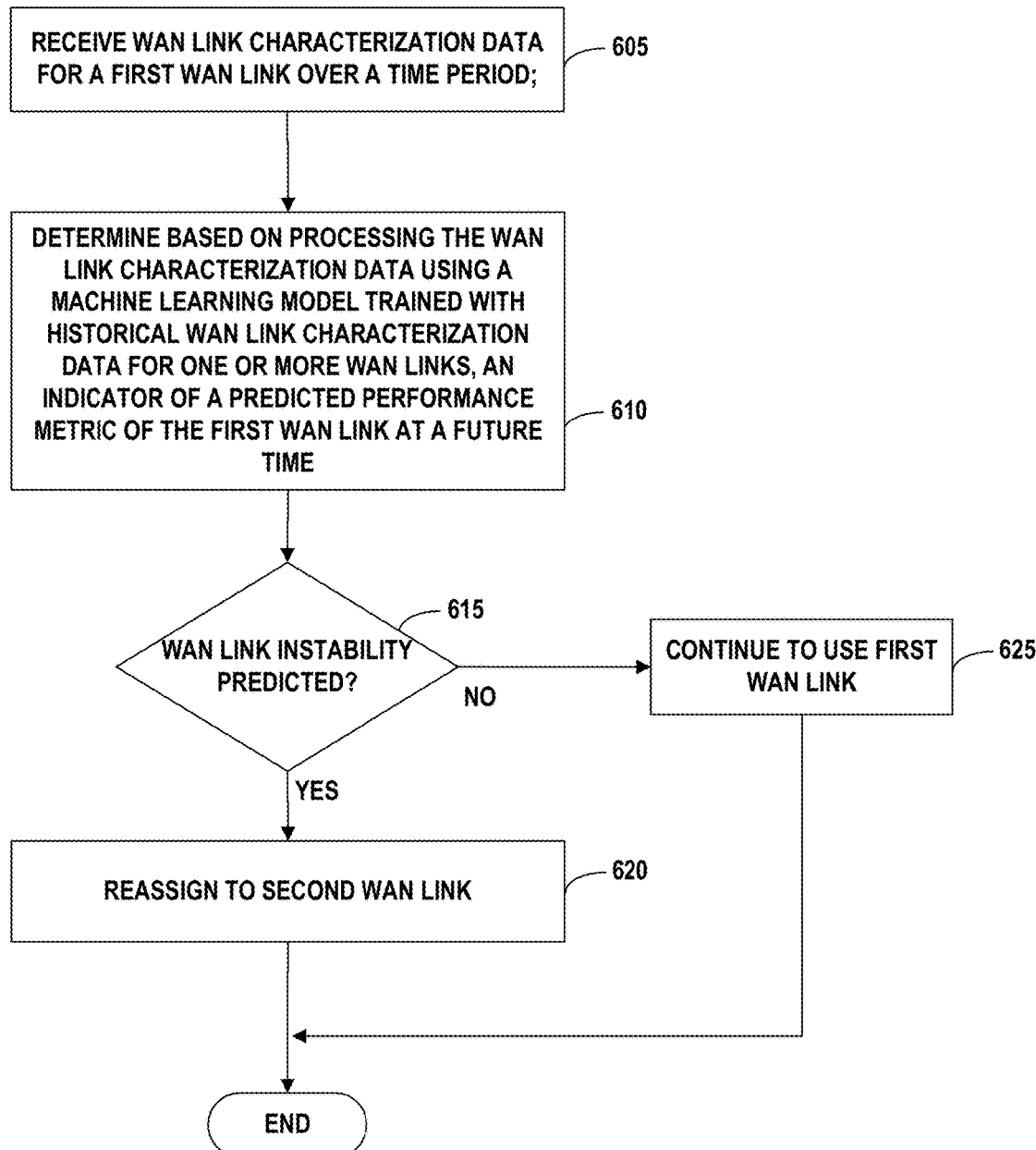
FIG. 6 is a flow chart illustrating an example method for reassigning a WAN link to an application, according to techniques described in this disclosure.

FIG. 6 is a flow chart illustrating an example method for reassigning a WAN link to an application, according to techniques described in this disclosure. An SD-WAN system may receive WAN link characterization data for a first WAN link over a time period (605). Next, the SD-WAN system may process the WAN link characterization data using a machine learning model trained with historical WAN link characterization data for one or more WAN links, to determine an indicator of predicted performance of the first WAN link at a future time (610). Next, the SD-WAN system determine if the indicator of predicted performance indicates that the WAN link may be instable at the future time (615). If the indicator of predicted performance indicates that the WAN link may become instable ("YES" branch of 615), the SD-WAN system may reassign an application using the first WAN link from the first WAN link to a second WAN link (620). IF the indicator of predicted performance does not indicate that the first WAN link may become instable ("NO" branch of 615), then the application may continue to use the first WAN link (626).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by computer-readable data storage media comprising instructions that, when executed, cause one or more processors to perform one or more of the methods described above. For example, the computer-readable data storage media may store such instructions for execution by one or more processors.

A computer-readable medium may form part of a computer program product, which may include packaging materials. Computer-readable media may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A Software-defined (SD) Wide Area Network (WAN) (SD-WAN) edge device comprising:
    processing circuitry; and
    memory storing instructions, that when executed, cause the processing circuitry to:
        obtain link characterization data for a first WAN link communicatively coupled to the SD-WAN edge device over a time period,
        determine, based on processing the link characterization data for the first WAN link using a machine learning model trained with historical characterization data for one or more WAN links, an indicator of a performance metric of the first WAN link at a future time and a time interval associated with the indicator of the performance metric, and
        assign, based on a determination of whether the time interval is predicted to begin after or before a session associated with an application assigned to the first WAN link is predicted to end, the application to remain on the first WAN link or move to a second WAN link communicatively coupled to the SD-WAN edge device instead of the first WAN link, respectively.

2. The SD-WAN edge device of claim 1,
wherein the instructions to assign the application comprise instructions to assign, further based on a determination that the time interval associated with the indicator of the performance metric exceeds a tolerance interval associated with the application, the application to the second WAN link instead of the first WAN link.

3. The SD-WAN edge device of claim 1, wherein the link characterization data comprises one or more of service data for the first WAN link, performance metric data indicating measured values for the first WAN link over the time period, a time to first packet, an average length of sessions, or a packet retransmission rate.

4. The SD-WAN edge device of claim 1, wherein the instructions further cause the processing circuitry to:
determine the time interval is predicted to begin after the session is predicted to end, and
wherein the processing circuitry being configured to assign the application comprises the processing circuitry being configured to assign the application to remain on the first WAN link.

5. The SD-WAN edge device of claim 1, wherein the instructions further cause the processing circuitry to:
determine the time interval is predicted to begin before the session is predicted to end, and
wherein the processing circuitry being configured to assign the application comprises the processing circuitry being configured to assign the application to the second WAN link instead of the first WAN link.

6. The SD-WAN edge device of claim 1, wherein a session interval for the application is a length of time the session associated with the application is expected to last,
wherein the session interval for the application comprises a first session interval,
wherein the application comprises a first application assigned to the first WAN link, and
wherein the first session interval has a value different than that of a second session interval of a second application assigned to the first WAN link,
wherein the instructions that cause the processing circuitry to assign the application comprises instructions that cause the processing circuitry to assign the first application to the second WAN link instead of the first WAN link,
wherein the instructions further cause the processing circuitry to: assign, based on the time interval and the second session interval for the second application, the second application to remain on the first WAN link.

7. The SD-WAN edge device of claim 1, wherein the SD-WAN edge device is positioned at an edge of a WAN that includes one or more intermediate routers, wherein instructions that cause the processing circuitry to obtain the link characterization data for the first WAN link comprises instructions that cause the processing circuitry to obtain the WAN link characterization data from the one or more intermediate routers.

8. The SD-WAN edge device of claim 1, wherein the SD-WAN edge device is positioned at an edge of a WAN that includes one or more intermediate routers and a plurality of other SD-WAN edge devices, wherein instructions that cause the processing circuitry to obtain the link characterization data for the first WAN link comprises instructions that cause the processing circuitry to obtain the link characterization data from an SD-WAN system that is in communication with the one or more intermediate routers and the plurality of other SD-WAN edge devices.

9. The SD-WAN edge device of claim 1, wherein the instructions further cause the processing circuitry to determine when the session associated with the application is predicted to end based on at least one of an average session length for the application, a minimum session length for the application, or and a maximum session length for the application.

10. The SD-WAN edge device of claim 1,
wherein the indicator of the performance metric of the first WAN link indicates a predicted interval of network instability of the first WAN link is expected to begin at the future time, and
wherein the time interval associated with the indicator comprises an expected duration of the predicted interval of network instability.

11. The SD-WAN edge device of claim 10, wherein the instructions further cause the processing circuitry to determine whether the session associated with the application will end prior to the future time at which the predicted interval of network instability of the first WAN link is expected to begin.

12. The SD-WAN edge device of claim 1, wherein the indicator of the performance metric of the first WAN link at the future time comprises a vector of predicted future values of performance metrics.

13. A method comprising:
obtaining, by a Software-defined (SD) Wide Area Network (WAN) (SD-WAN) edge device, link characterization data for a first WAN link communicatively coupled to the SD-WAN edge device over a time period,
determining, by the SD-WAN edge device and based on processing the link characterization data for the first WAN link using a machine learning model trained with historical characterization data for one or more WAN links, an indicator of a performance metric of the first WAN link at a future time and a time interval associated with the indicator of the performance metric, and
assigning, by the SD-WAN edge device and based on a determination of whether the time interval is predicted to begin after or before a session associated with an application assigned to the first WAN link is predicted to end, the application to remain on the first WAN link or move to a second WAN link communicatively coupled to the SD-WAN edge device instead of the first WAN link, respectively.

14. The method of claim 13, wherein the indicator of the performance metric of the first WAN link at the future time comprises a vector of predicted future values of performance metrics.

15. Non-transitory computer-readable storage media comprising instructions that, when executed by one or more processors of a Software-defined (SD) Wide Area Network (WAN) (SD-WAN) edge device, cause the one or more processors to:
obtain link characterization data for a first WAN link communicatively coupled to the SD-WAN edge device over a time period,
determine, based on processing the link characterization data for the first WAN link using a machine learning model trained with historical characterization data for one or more WAN links, an indicator of a performance metric of the first WAN link at a future time and a time interval associated with the indicator of the performance metric, and
assign, based on a determination of whether the time interval is predicted to begin after or before a session associated with an application assigned to the first WAN link is predicted to end, the application to remain on the first WAN link or move to a second WAN link communicatively coupled to the SD-WAN edge device instead of the first WAN link, respectively.

16. The non-transitory computer-readable storage media of claim 15, wherein the link characterization data comprises one or more of service data for the first WAN link, performance metric data indicating measured values for the first WAN link over the time period, a time to first packet, an average length of sessions, or a packet retransmission rate.

17. The non-transitory computer-readable storage media of claim 15, wherein the indicator of the performance metric of the first WAN link at the future time comprises a predicted future value of the performance metric.

18. The non-transitory computer-readable storage media of claim 15, wherein the indicator of the performance metric of the first WAN link at the future time comprises a vector of predicted future values of performance metrics.

19. The non-transitory computer-readable storage media of claim 15, wherein the indicator of the performance metric of the first WAN link at the future time comprises a probability that the first WAN link will become unstable at the future time.

20. The non-transitory computer-readable storage media of claim 15, wherein the indicator of the performance metric of the first WAN link at the future time comprises a vector of probability values associated with corresponding ones of a plurality of performance metrics that indicates a probability that a given performance metric of the plurality of performance metrics will violate a service level agreement (SLA) parameter.

* * * * *